US012637959B2

(12) United States Patent
Tomes

(10) Patent No.: US 12,637,959 B2
(45) Date of Patent: May 26, 2026

(54) CONTAINMENT RING FOR GAS TURBINE ENGINE

(71) Applicant: Pratt & Whitney Canada Corp., Longueuil (CA)

(72) Inventor: Nathan Tomes, Hamilton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 33 days.

(21) Appl. No.: 18/652,695

(22) Filed: May 1, 2024

(65) Prior Publication Data

US 2025/0341173 A1 Nov. 6, 2025

(51) Int. Cl.
*F01D 21/04* (2006.01)
*F01D 25/00* (2006.01)
*F01D 25/24* (2006.01)

(52) U.S. Cl.
CPC ......... *F01D 21/045* (2013.01); *F01D 25/005* (2013.01); *F01D 25/24* (2013.01); *F05D 2220/36* (2013.01); *F05D 2300/601* (2013.01); *F05D 2300/6033* (2013.01)

(58) Field of Classification Search
CPC ........ F01D 21/04; F01D 21/045; F01D 25/24; F01D 25/005; F05D 2240/11; F05D 2220/36; F05D 2300/601; F05D 2300/6033
See application file for complete search history.

(56) References Cited

U.S. PATENT DOCUMENTS

| | | | | |
|---|---|---|---|---|
| 6,637,186 | B1 * | 10/2003 | Van Duyn ............... | F01D 21/04 60/226.1 |
| 6,895,851 | B1 | 5/2005 | Adams et al. | |
| 7,008,173 | B2 * | 3/2006 | Gabrys ................. | F01D 21/045 74/609 |
| 7,597,040 | B2 * | 10/2009 | Gabrys ..................... | B32B 3/18 89/36.01 |
| 7,604,199 | B2 * | 10/2009 | McMillan ............. | F01D 21/045 415/9 |
| 8,827,629 | B2 | 9/2014 | Voleti et al. | |
| 9,714,583 | B2 * | 7/2017 | Watson ................. | F01D 21/045 |
| 10,428,681 | B2 | 10/2019 | Finlayson et al. | |
| 11,008,887 | B2 * | 5/2021 | Hall ........................ | F01D 25/26 |
| 2006/0165519 | A1 | 7/2006 | Mcmillan et al. | |
| 2016/0053632 | A1 | 2/2016 | Watson | |
| 2021/0332717 | A1 | 10/2021 | Karafillis et al. | |

FOREIGN PATENT DOCUMENTS

EP 2834474 B1 8/2017

OTHER PUBLICATIONS

Extended European Search Report for EP Application No. 25173864.7; Issue date, Sep. 24, 2025, 91 pages.

* cited by examiner

*Primary Examiner* — Brian P Wolcott
(74) *Attorney, Agent, or Firm* — CANTOR COLBURN LLP

(57) ABSTRACT

A casing for a gas turbine engine, including: an inner ring portion; an outer ring portion; and a plurality of blunting plates arranged circumferentially between the inner ring portion and the outer ring portion, wherein the plurality of blunting plates are positioned to overlap each other.

19 Claims, 5 Drawing Sheets

CONTAINMENT RING FOR GAS TURBINE ENGINE

BACKGROUND

This disclosure relates to gas turbine engines, and more particularly to a containment ring for a gas turbine engine.

Gas turbine engines include rotating blades. In the event of a failure of any of the rotating blades it is desirable to contain the dislodged blade within the engine.

As such, it is desirable to provide an apparatus and method for blade containment in a gas turbine engine.

BRIEF DESCRIPTION

Disclosed is a casing for a gas turbine engine, including: an inner ring portion; an outer ring portion; and a plurality of blunting plates arranged circumferentially between the inner ring portion and the outer ring portion, wherein the plurality of blunting plates are positioned to overlap each other.

In addition to one or more of the features described above, or as an alternative to any of the foregoing embodiments, a first end of each blunting plate is closer to the outer ring portion than a second end of each blunting plate.

In addition to one or more of the features described above, or as an alternative to any of the foregoing embodiments, each blunting plate of the plurality of blunting plates is angularly orientated with respect to the inner ring portion and the outer ring portion.

In addition to one or more of the features described above, or as an alternative to any of the foregoing embodiments, the casing is a fan casing.

In addition to one or more of the features described above, or as an alternative to any of the foregoing embodiments, a first end of each blunting plate is closer to the outer ring portion than a second end of each blunting plate and the second end of each blunting plate is circumferentially located between the first end and the second end of an adjacent blunting plate.

In addition to one or more of the features described above, or as an alternative to any of the foregoing embodiments, the inner ring portion includes a recessed area, and an abradable surface is located in the recessed area.

In addition to one or more of the features described above, or as an alternative to any of the foregoing embodiments, a pair of wall portions extend outwardly from the outer ring portion, the outer ring portion and the pair of wall portions forming a receiving area and an outer containment layer is located in the receiving area.

In addition to one or more of the features described above, or as an alternative to any of the foregoing embodiments, the outer containment layer is a dry fabric wrap made of synthetic fibers.

In addition to one or more of the features described above, or as an alternative to any of the foregoing embodiments, each blunting plate of the plurality of blunting plates is a laminated composite including at least one ductile layer and at least one hard ceramic layer.

In addition to one or more of the features described above, or as an alternative to any of the foregoing embodiments, the at least one ductile layer is one of the following; steel, aluminum, titanium, or a polymer and the at least one hard ceramic layer is a solid ceramic such as silicon carbide or boron carbide, or a ceramic matrix composite.

In addition to one or more of the features described above, or as an alternative to any of the foregoing embodiments, the at least one ductile layer is faces the outer ring portion and the at least one hard ceramic layer faces the inner ring portion.

In addition to one or more of the features described above, or as an alternative to any of the foregoing embodiments, a plurality of volumes are located between the outer ring portion and the plurality of blunting plates and a volume is located between the plurality of blunting plates and the inner ring portion.

In addition to one or more of the features described above, or as an alternative to any of the foregoing embodiments, a plurality of volumes are filled with a structural honeycomb and the volume is filled with a structural honeycomb.

In addition to one or more of the features described above, or as an alternative to any of the foregoing embodiments, the structural honeycomb located in the plurality of volumes orthogonally arranged with respect to each blunting plate of the plurality of blunting plates.

In addition to one or more of the features described above, or as an alternative to any of the foregoing embodiments, each blunting plate of the plurality of blunting plates is a laminated composite including at least one ductile layer and at least one hard ceramic layer and a first end of each blunting plate a second end of each blunting plate are curved towards the outer ring portion.

In addition to one or more of the features described above, or as an alternative to any of the foregoing embodiments, each blunting plate of the plurality of blunting plates is a laminated composite including at least one ductile layer and at least one hard ceramic layer and a plurality of ribs extend away from the at least one ductile layer.

Also disclosed is a gas turbine engine, including: a fan having a plurality of fan blades; a casing surrounding the plurality of fan blades, the casing including: an inner ring portion; an outer ring portion; and a plurality of blunting plates arranged circumferentially between the inner ring portion and the outer ring portion, wherein the plurality of blunting plates are positioned to overlap each other.

In addition to one or more of the features described above, or as an alternative to any of the foregoing embodiments, a first end of each blunting plate is closer to the outer ring portion than a second end of each blunting plate.

In addition to one or more of the features described above, or as an alternative to any of the foregoing embodiments, each blunting plate of the plurality of blunting plates is angularly orientated with respect to the inner ring portion and the outer ring portion.

In addition to one or more of the features described above, or as an alternative to any of the foregoing embodiments, a first end of each blunting plate is closer to the outer ring portion than a second end of each blunting plate and the second end of each blunting plate is located circumferentially between the first end and the second end of an adjacent blunting plate.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
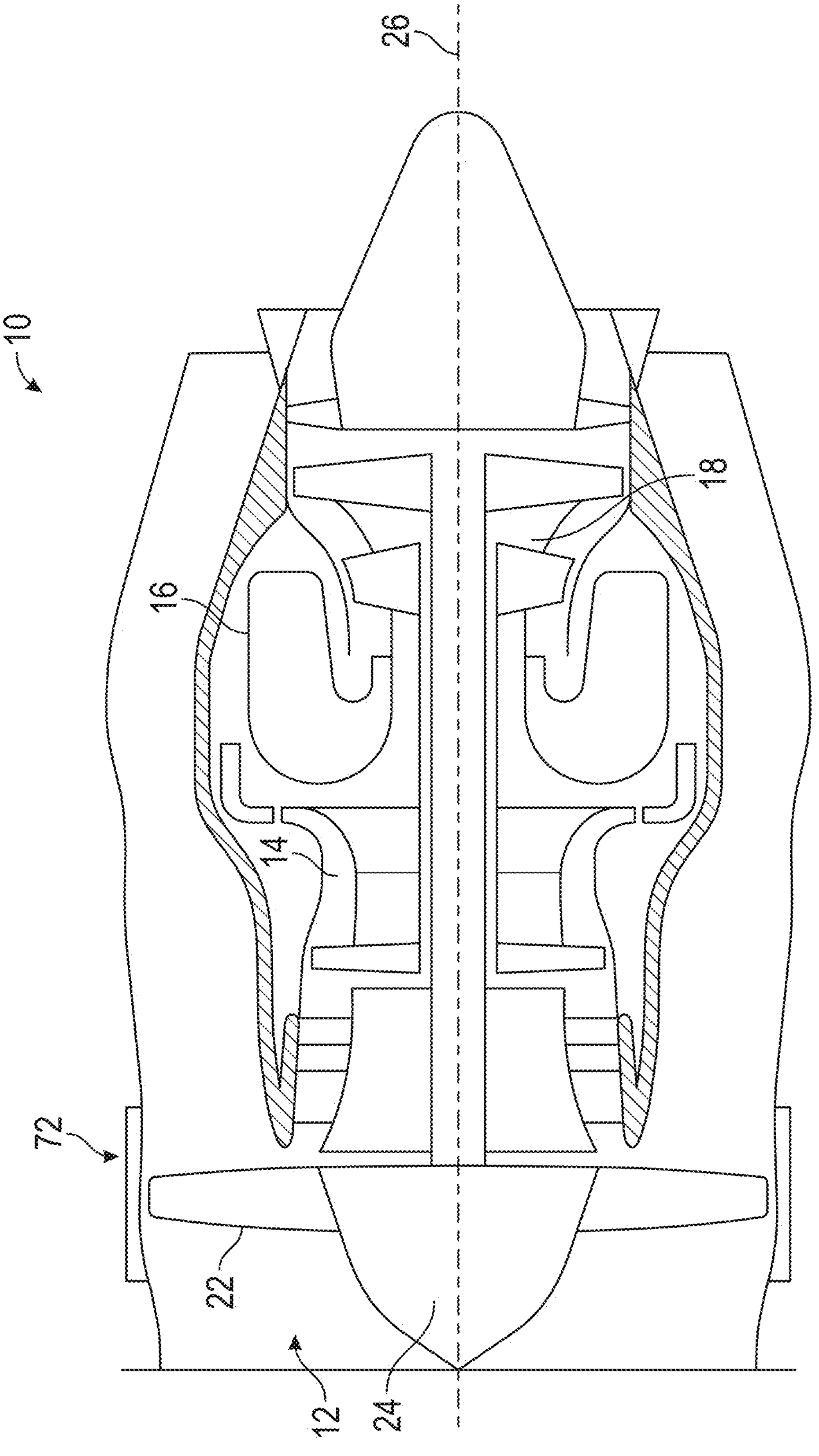
FIG. 1 is a schematic, partial cross-sectional view of a gas turbine engine in accordance with this disclosure.

FIG. 1 illustrates a turbofan gas turbine engine 10 of a type provided for use in subsonic flight, generally comprising in serial flow communication a fan 12 through which ambient air is propelled, a multi-stage compressor 14 for pressurizing the air, a combustor 16 in which the compressed air is mixed with fuel and ignited for generating an annular stream of hot combustion gases, and a turbine section 18 for extracting energy from the combustion gases. The fan 12 includes a fan case 72 surrounding a circumferential array of fan blades 22 extending radially outwardly from a rotor 24 mounted for rotation about a central axis 26 of the engine 10.

It should be noted that the terms "radial", "axial" and "circumferential" used throughout the description and the appended claims, are defined with respect to the central axis 26 of the engine 10. The terms "front", "forward" "afore", "aft" and after" used throughout the description and the appended claims are defined with respect to the flow direction of air being propelled through the engine.

In one non-limiting example, the fan 12 includes a plurality of fan blades 22. It is necessary to retain high energy debris resulting from a blade failure of any stage in the gas turbine engine 10 and this debris must be contained within the engine. In the case of a fan blade off, there are at least two dominant methods of achieving the containment of the fan blades 22. These may be referred to as hard wall and soft wall.

Hardwall containment relies upon a single ring of a strong material to contain the fan blade. This ring can be made of metal or composite, it may have ribs for stiffening specific areas, may have variable thickness or radius, and the fan case may include other layers (abradable and/or a blade tip blunting layer for example), but most of the energy is absorbed by the single containment ring. The advantage of hardwall containment is that it achieves containment reliably within a relatively small amount of space and with limited deflection, allowing the nacelle profile to be defined as tight as possible to the gas path to minimize powerplant drag. The disadvantages are that the forces generated in containment are very high, and are concentrated directly at the point of impact with limited redistribution around the ring, and the released blade remains in the gaspath, continuing to interact with the remaining blades, usually fracturing into multiple pieces, and travelling either upstream out the inlet or downstream out the exhaust and possibly interacting with structure along the way. The high, concentrated containment forces are transferred to the inlet, often driving heavier designs for inlet attachment flange and inlet structure. The blade remaining in the gaspath causes higher interaction forces with the following blade, sometimes driving increased blade weight to withstand these forces or in a few cases, causing multiple blades to release. The longer interaction also causes difficulties for trajectory predictions which are an important simulation validation point.

Soft wall containment relies on a multi-layered belt of dry Kevlar to contain the fan blade. The blade is allowed to pass through the structure of the fan cases (often a lightweight sandwich structure) and hit the Kevlar. The Kevlar belts slip and stretch significantly while absorbing the blade's kinetic energy, causing a large bulge. The longer distance across which the blade travels during containment means that the peak force on the fan case is lower compared to hardwall containment, and the belt effectively redistributes the containment force around the circumference of the case. These effects together usually allow the fan case and adjacent structure to be lighter compared to hardwall containment. In addition, because the released blade exits the gaspath entirely, it only briefly interacts with the remaining fan blades, allowing further weight reduction. While prediction of the released blade trajectory is not trivial in soft wall containment, it is less chaotic than hardwall systems because following containment the blade is trapped between the case structure and the Kevlar belt. The disadvantages of soft wall containment are that the Kevlar bulge is significant, driving the nacelle loft outward, increasing drag. The bulge also causes the need for a keep out zone all around the fan case through which no crucial or hazardous hardware may pass, further complicating the design.

Figure 2:
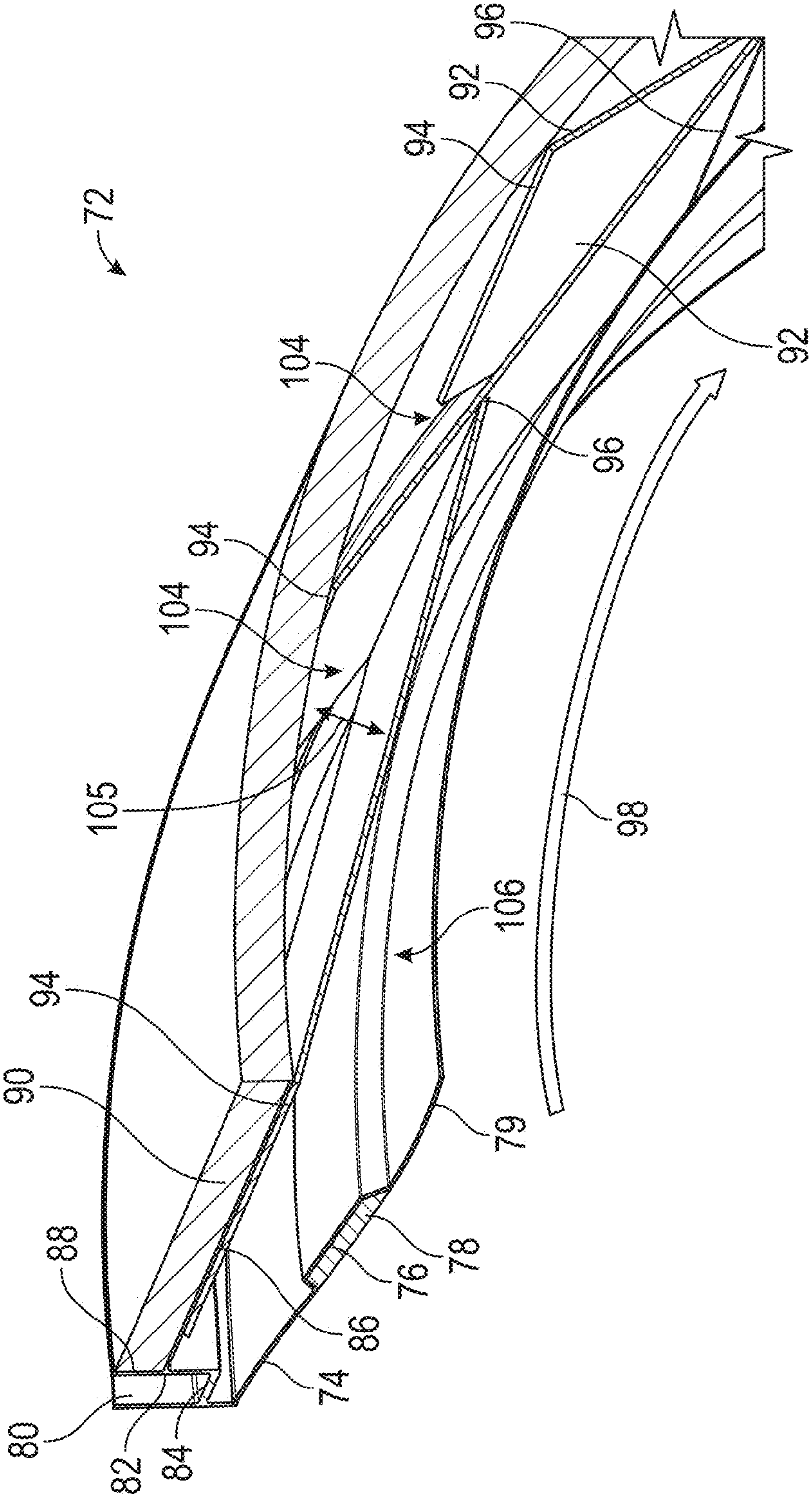
FIGS. 2 and 3 are partial perspective cross-sectional views of a fan case in accordance with the present disclosure.

FIG. 2 illustrates a portion of a casing 72 in accordance with the present disclosure. In one embodiment, the casing 72 is a fan casing 72 intended to retain fan blades 22 of the fan 12. It should be understood that while the casing 72 is illustrated as a fan casing the design of the casing 72 can be applied to other containment stages of the gas turbine engine (e.g., compressor section and turbine section).

As used herein forward or upstream and rearward or downstream refer are relative to the engine central longitudinal axis 26 and the direction gases flowing through the gas turbine engine 10. In addition, radially inward and radially outward also refer to the engine central longitudinal axis 26.

As used herein, "integral" or "integrally formed" is intended to cover a single unitary structure. In other words, the single unitary structure is not capable of being disassembled without cutting or destruction of the single unitary structure.

As illustrated in at least FIGS. 2-5, the casing 72 includes an inner ring portion or gas path skin 74. In one non-limiting embodiment, the inner ring portion or gas path skin 74 may be formed from sheet metal or metal that is ductile. In another embodiment, the inner ring portion or gas path skin 74 may be formed a composite material. In one non-limiting embodiment, the composite material being anyone of glass, carbon, or aramid fiber reinforced epoxy or equivalents thereof. The inner ring portion or gas path skin 74 may be formed with a recessed area 76 for receipt of an abradable surface or layer 78 such as a composite potting material. The abradable surface 78 being aligned with rotating blades 22 of the fan 12. The recessed area 76 and the abradable surface or layer 78 are located on a radially inner surface 79 of the inner ring portion or gas path skin 74. Of course, embodiments of the present disclosure contemplate an inner ring portion or gas path skin 74 without the recessed area 76 and abradable surface or layer 78. The inner ring portion or gas path skin 74 may also be configured to have perforations for acoustic purposes.

Secured to the inner ring portion and/or gas path skin 74 is a pair of flanges 80 that extend radially outward from a forward end and an aft end of the inner ring portion and/or gas path skin 74 respectively. The flanges 80 may have openings 81 for bolts or fasteners (not shown) to pass therethrough in order to secure the casing 72 to engine 10.

The casing 72 also includes a pair of wall portions 82 that are secured to the pair of flanges 80 by a pair of axially extending connecting portions 84 respectively. The pair of wall portions 82 extend radially outward and an outer ring portion or outer skin 86 extends between the pair of wall portions 82. The pair of wall portions 82 and the outer ring portion or outer skin 86 form a cavity or receiving area 88 configured to receive an outer containment layer 90.

In one non limiting embodiment, the pair of wall portions 82, the outer ring portion or outer skin 86, the pair of axially extending connecting portions 84, the pair of flanges 80 may be formed integrally as a single unitary structure. As used herein, "integral" or "integrally formed" is intended to cover a single unitary structure. In other words, the single unitary structure is not capable of being disassembled without cutting or destruction of the single unitary structure. In other words, integrally formed is intended to cover a single structure having the aforementioned features (e.g., the pair of wall portions 82, the outer ring portion or outer skin 86 the pair of actually extending connecting portions 84, the pair of flanges 80 and the inner ring portion or gas path skin 74).

Alternatively, the pair of wall portions 82, the outer ring portion or outer skin 86 the pair of actually extending connecting portions 84, the pair of flanges 80 and the inner ring portion or gas path skin 74 maybe separately formed and separately secured together by a welding or bonding process to form portions of the casing 72 illustrated in the attached FIGS.

In one embodiment, the pair of wall portions 82, the outer ring portion or outer skin 86, the pair of axially extending connecting portions 84, the pair of flanges 80 and the inner ring portion or gas path skin 74 are formed from a composite material or alternatively a metal such as sheet metal.

In one non limiting embodiment, the outer containment layer 90 is formed of a dry fabric wrap made of synthetic fibers such as Kevlar.

In accordance with the present disclosure, the casing 72 includes a plurality of blunting plates 92 arranged circumferentially between the inner ring portion or gas path skin 74 and the outer ring portion or outer skin 86. In one embodiment and as illustrated, the plurality of blunting plates 92 are positioned to overlap each other. As illustrated, a first end 94 of each blunting plate 92 is closer to the outer ring portion or outer skin 86 than a second end 96 of each blunting plate 92. As such, each blunting plate is angularly orientated with respect to the inner ring portion or gas path skin 74 and the outer ring portion or outer skin 86. In addition, at least the second end 96 of each blunting plate 92 is circumferentially located between the first end 94 and a second end 96 of an adjacent blunting plate 92 so that there is and overlapping configuration. Accordingly, each blunting plate 92 is angularly orientated with respect to a direction of rotation of the plurality of blades 22 of the fan 12 illustrated by arrow 98 in FIGS. 2 and 4. The direction of rotation illustrated by arrow 98 refers to operational rotation of the plurality of blades 22 of the fan 12. In other words, the first end of 94 of each blunting plate 92 is further away from each blade 22 of the fan than the second end 96 of each blunting plate 92.

Figure 5:
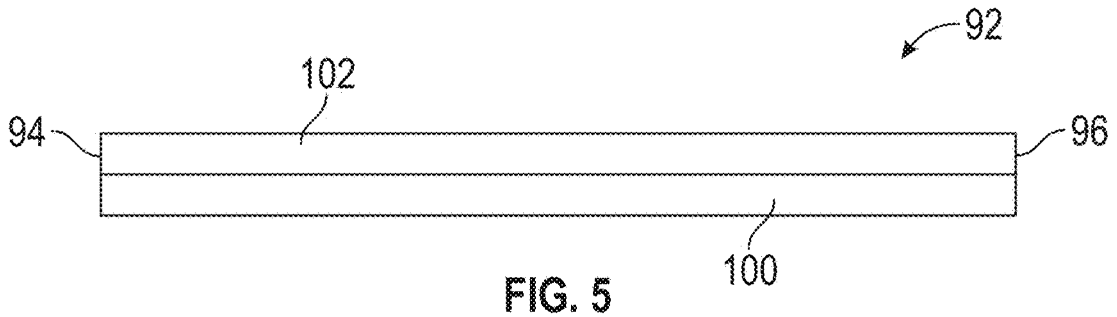
FIG. 5 is a schematic cross-sectional view of a blunting plate in accordance with the present disclosure.

In one embodiment and referring to at least FIG. 5, each blunting plates 92 is a laminated composite including at least one ductile layer 100 (such as steel, aluminum, titanium or polymer) and at least one hard ceramic layer 102 (a solid ceramic such as silicon carbide, boron carbide, or ceramic matrix composite). The at least one hard ceramic layer 102 is faced toward the inner diameter and the fan blades 22 such that it is impacted directly by a released blade, and the ductile material is faced toward the outside such that it is not directly impacted by the released blade 22 but acts to keep fragments of the at least one hard ceramic layer 102 together after fracture occurs.

Figure 3:
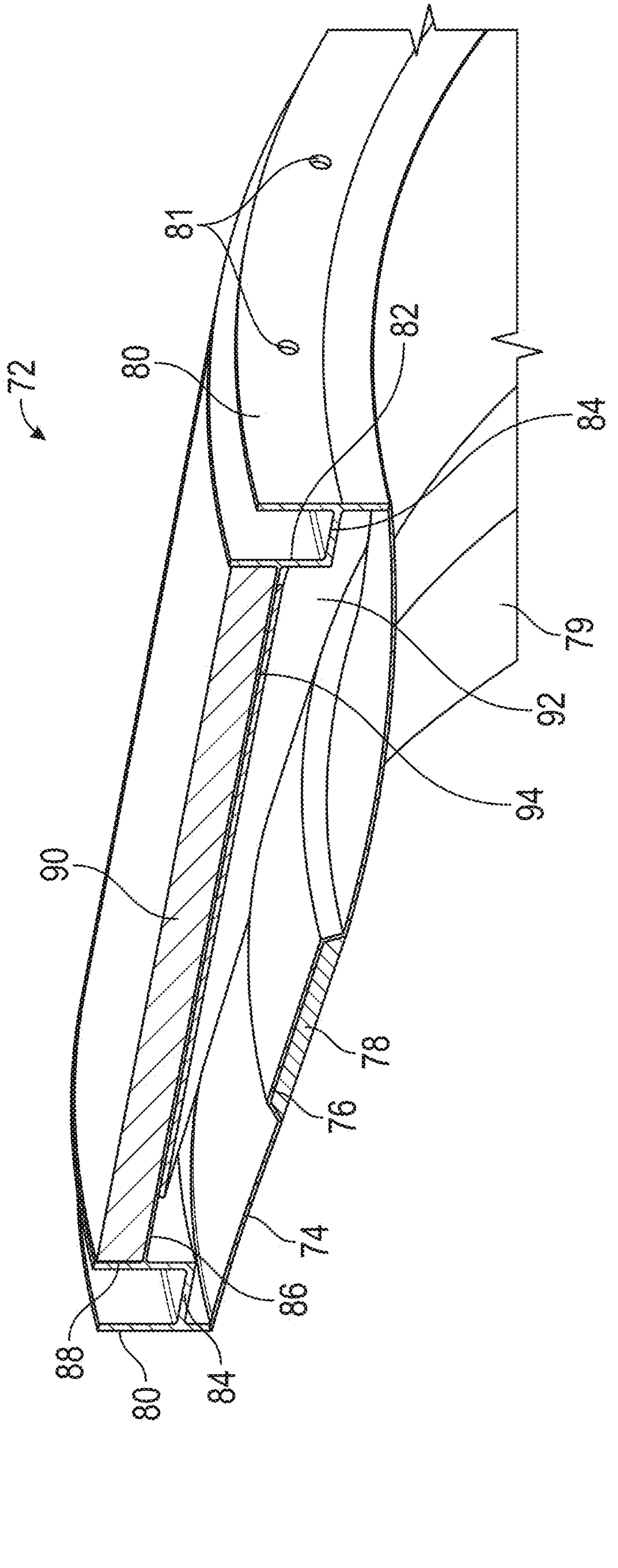
Figure 4:
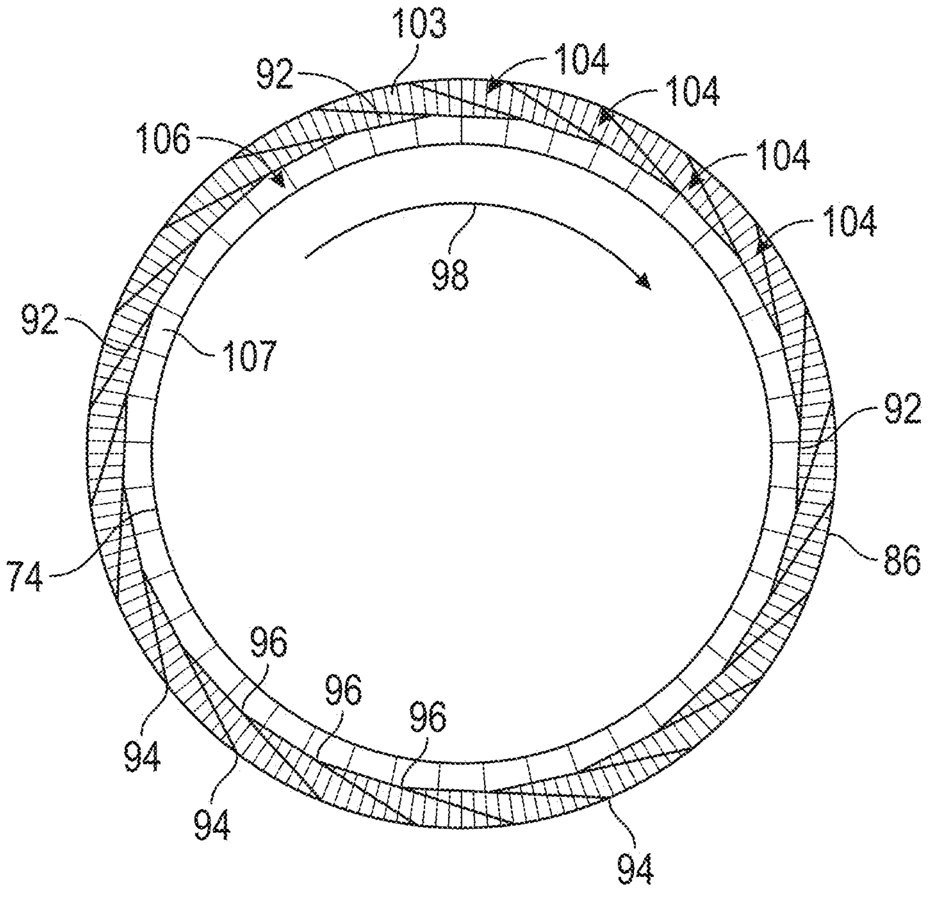
FIG. 4 is an end view of a fan case in accordance with the present disclosure.

As illustrated in at least FIGS. 2-4, the blunting plates 92 are overlapped in a pattern such that a released blade will not slip between two adjacent plates 92. The blunting plates 92 are flat in one embodiment for ease of manufacturing.

Volumes 104 are defined between the blunting plates 92 and the outer ring portion or outer skin 86. These volumes 104 are filled with a light weight structural honeycomb or foam 103 (see at least FIG. 4). In one non-limiting embodiment, the layer of honeycomb 103 is Nomex or aluminum single or double flex honeycomb or corrugated aluminum. In one non-limiting embodiment, the layer of honeycomb is NOMEX honeycomb. As used herein, NOMEX honeycomb refers to a honeycomb core formed from NOMEX paper sheets that are coated and bonded together with a phenolic resin. NOMEX paper may be defined as sheets formed from a synthetic aromatic polyamide polymer or a synthetic textile fiber or equivalents thereof. In one non-limiting embodiment, the layer of foam 103 is aluminum or polymer open or closed cell foam.

The honeycomb will be oriented such that cell walls of the honeycomb are normal or orthogonally arranged (illustrated by arrows 105 in FIG. 2) to the blunting plate 92 that is immediately next to it in the negative radial direction so that the crush strength is optimal. In one non-limiting embodiment, the structural honeycomb located in the plurality of volumes is orthogonally arranged with respect to each respective blunting plate of the plurality of blunting plates.

In addition, a cavity or volume 106 is located between the blunting plates 92 and the inner ring portion or gas path skin 74. A light weight structural honeycomb or foam 107 is located in this cavity or volume 106 as well.

In the event that a blade 22 is inadvertently released from the fan 12, it will pass through the abradable surface or layer 78 and the inner ring portion or gas path skin 74 without losing significant energy, but the blade will bend and may form a cutting tip. Once the released blade hits the blunting plate 92, both the released blade and blunting plate 92 will deform significantly and the blunting plate 92 will act to distribute the containment force to the backing honeycomb. The honeycomb will crush, absorbing significant energy. Once compacted, the containment force will be transferred to the outer skin or outer ring portion 86 which will fracture. Finally, the blade will push the blunting plate 92 through the hole and be arrested by the Kevlar containment layers or containment ring 90. All the while, the blunting plate 92 will prevent cutting and puncture of the Kevlar layers, thereby ensuring that each layer of the containment ring 90 acts as efficiently as possible in absorbing the blade's kinetic energy.

The blunting plates 92 are not secured to each other both for ease of manufacture and as well as to allow the blunting plates 92 to move with a released blade and act as a force redistribution layer. If instead the plate 92 were secured to each other and formed a ring, fracture would lead to more sharp corners, either in the blade passing through the formed ring of blunting plates 92 or portions of the ring itself. This could lead to undesired tearing or cutting. While the blunting plates 92 are not secured to each other the intermediary layers of foam and/or honeycomb are bonded to the blunting plates 92 by an epoxy or polyurethane or equivalents thereof.

Under normal operating conditions (e.g., non-blade release), the blunting plates 92 will contribute stiffness to the fan case 72 but are not part of the primary structure of the case 72.

In one embodiment, the blunting plates 92 are intended to prevent a released blade from cutting through containment material due to sharp edges formed as the blade passes through the case 72. Additionally, the blunting plates 92 effectively redistribute the containment forces, allowing each layer of material outside the plates 92 to act as efficiently as possible in absorbing the blade's kinetic energy. All of this together allows a lighter and more predictable containment design.

Although the previously disclosed embodiments shows the blunting plates 92 applied to soft wall containment, but they could also be employed with any type of containment structure (hard wall, crush based, flexible hard wall, etc.).

In one embodiment, the blunting plates 92 could be placed so that at least some or all of the second ends 96 touch an adjacent blunting plate 92 as shown in FIG. 2 or alternatively the blunting plates 92 or at least some of the blunting plates 92 could be installed as fully floating wherein either end 94 or 96 or both ends 94, 96 are not secured to an adjacent blunting plate 92 or the inner ring portion or gas path skin 74.

Figure 6:
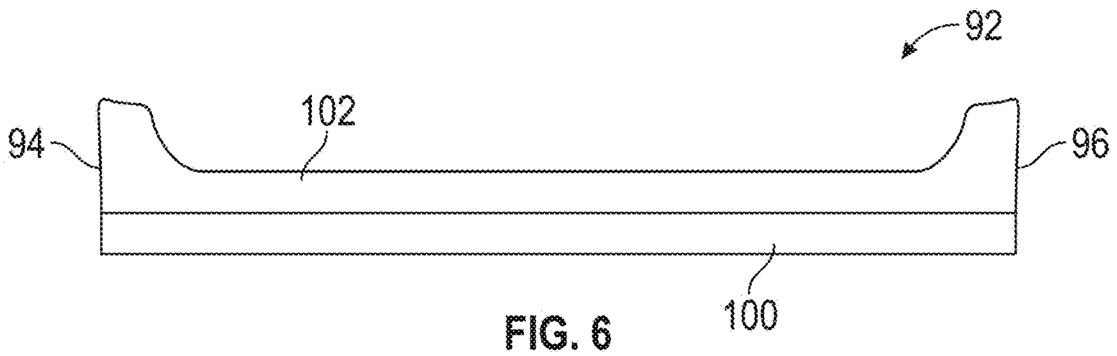
FIG. 6 is a schematic cross-sectional view of a blunting plate in accordance with an alternative embodiment of the present disclosure.

Referring now to FIG. 6, an alternative embodiment of the present disclosure is illustrated. Here, the blunting plates 92 could be curved inward at the upstream and downstream edges towards the outer ring layer to help the blade remain centered throughout containment.

Figure 7:
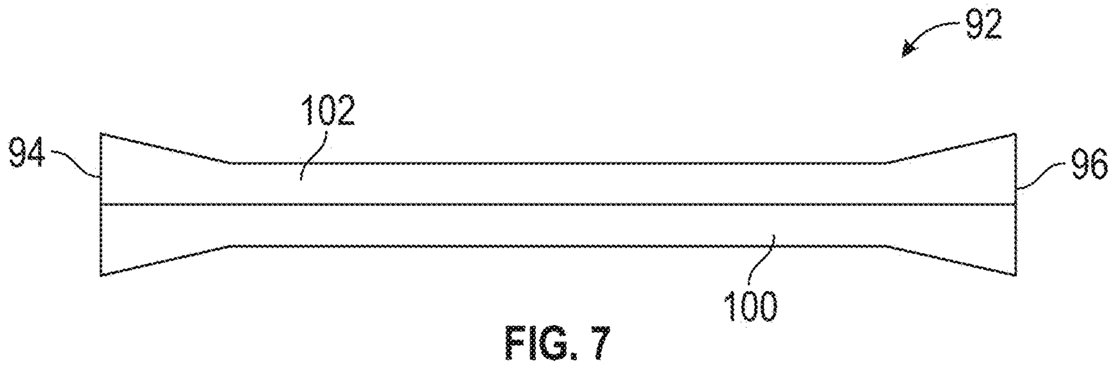
FIG. 7 is a schematic cross-sectional view of a blunting plate in accordance with an alternative embodiment of the present disclosure.

Referring now to FIG. 7, yet an alternative embodiment of the present disclosure is illustrated. Here, the blunting plates 92 are thickened at some or all edges 94, 96 to help the blade remain centered throughout containment.

Figure 8:
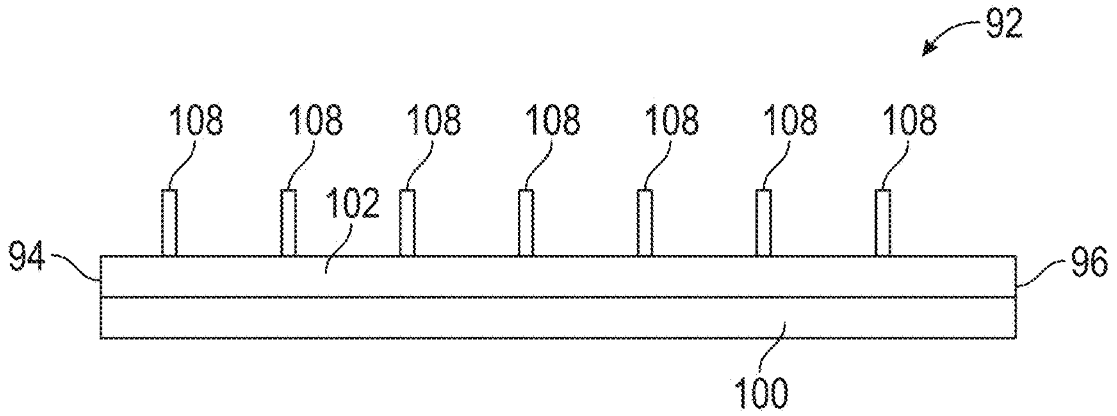
FIG. 8 is a schematic cross-sectional view of a blunting plate in accordance with an alternative embodiment of the present disclosure.

Referring now to FIG. 8, yet another alternative embodiment of the present disclosure is illustrated. Here, the blunting plates 92 include ribs 108 on the sides that face the outer ring layer 86. The ribs 108 extend towards the outer ring layer 86. These could be used to control the way they deform, possibly absorb additional energy in bending or buckling, and in turn control the released blade trajectory.

In yet another alternative embodiment, the blunting plates 92 could be made of other material(s), but the inner surface facing the inner ring portion or gas path skin 74 must be hard enough to prevent the blunting plate 92 from being penetrated due to being cut by sharp fragments, and ductile enough to prevent the fragment from penetrating the blunting plate 92 due to fracture. One embodiment, would be a steel plate with the inner surface face hardened such that the inner surface is hard and brittle, but the rest of the material remains ductile.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof.

Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A casing for a gas turbine engine, comprising:
an inner ring portion;
an outer ring portion; and
a plurality of blunting plates arranged circumferentially between the inner ring portion and the outer ring portion, wherein the plurality of blunting plates are positioned to overlap each other, and each blunting plate of the plurality of blunting plates is a laminated composite including at least one ductile layer and at least one hard ceramic layer.

2. The casing as in claim 1, wherein a first end of each blunting plate is closer to the outer ring portion than a second end of each blunting plate.

3. The casing as in claim 1, wherein each blunting plate of the plurality of blunting plates is angularly orientated with respect to the inner ring portion and the outer ring portion.

4. The casing as in claim 1, wherein the casing is a fan casing.

5. The casing as in claim 1, wherein a first end of each blunting plate is closer to the outer ring portion than a second end of each blunting plate and the second end of each blunting plate is circumferentially located between the first end and the second end of an adjacent blunting plate.

6. The casing as in claim 1, wherein the inner ring portion includes a recessed area, and an abradable surface is located in the recessed area.

7. The casing as in claim 1, further comprising a pair of wall portions extending outwardly from the outer ring portion, the outer ring portion and the pair of wall portions forming a receiving area and an outer containment layer is located in the receiving area.

8. The casing as in claim 7, wherein the outer containment layer is a dry fabric wrap made of synthetic fibers.

9. The casing as in claim 1, wherein the at least one ductile layer is one of the following; steel, aluminum, titanium, or a polymer and the at least one hard ceramic layer is a solid ceramic such as silicon carbide or boron carbide, or a ceramic matrix composite.

10. The casing as in claim 1, wherein the at least one ductile layer faces the outer ring portion and the at least one hard ceramic layer faces the inner ring portion.

11. A casing for a gas turbine engine, comprising:
an inner ring portion;
an outer ring portion; and
a plurality of blunting plates arranged circumferentially between the inner ring portion and the outer ring portion, wherein the plurality of blunting plates are positioned to overlap each other, and a plurality of volumes are located between the outer ring portion and the plurality of blunting plates and a volume is located between the plurality of blunting plates and the inner ring portion.

12. The casing as in claim 11, wherein a plurality of volumes are filled with a structural honeycomb and the volume is filled with a structural honeycomb.

13. The casing as in claim 12, wherein the structural honeycomb located in the plurality of volumes orthogonally arranged with respect to each blunting plate of the plurality of blunting plates.

14. The casing as in claim 1, wherein a first end of each blunting plate a second end of each blunting plate are curved towards the outer ring portion.

15. The casing as in claim 1, wherein a plurality of ribs extend away from the at least one ductile layer.

16. A gas turbine engine, comprising:

a fan having a plurality of fan blades;

a casing surrounding the plurality of fan blades, the casing comprising:

an inner ring portion;

an outer ring portion; and a plurality of blunting plates arranged circumferentially between the inner ring portion and the outer ring portion, wherein the plurality of blunting plates are positioned to overlap each other, and each blunting plate of the plurality of blunting plates is a laminated composite including at least one ductile layer and at least one hard ceramic layer and/or a plurality of volumes are located between the outer ring portion and the plurality of blunting plates and a volume is located between the plurality of blunting plates and the inner ring portion.

17. The gas turbine engine as in claim 16, wherein a first end of each blunting plate is closer to the outer ring portion than a second end of each blunting plate.

18. The gas turbine engine as in claim 16, wherein each blunting plate of the plurality of blunting plates is angularly orientated with respect to the inner ring portion and the outer ring portion.

19. The gas turbine engine as in claim 16, wherein a first end of each blunting plate is closer to the outer ring portion than a second end of each blunting plate and the second end of each blunting plate is circumferentially located between the first end and the second end of an adjacent blunting plate.

* * * * *